(12) United States Patent
Oda et al.

(10) Patent No.: US 7,791,461 B2
(45) Date of Patent: Sep. 7, 2010

(54) TIRE MANAGEMENT SYSTEM WITH DATA DEMANDING SIGNAL AND TIRE STATUS VALUE TRANSMITTING AT DIFFERENT CYCLES

(75) Inventors: Keiji Oda, Tokyo (JP); Koji Takao, Hachioji (JP)

(73) Assignee: Bridgestone Corporation, Tokyo (JP)

( * ) Notice: Subject to any disclaimer, the term of this patent is extended or adjusted under 35 U.S.C. 154(b) by 854 days.

(21) Appl. No.: 11/629,459

(22) PCT Filed: Jun. 3, 2005

(86) PCT No.: PCT/JP2005/010251

§ 371 (c)(1),
(2), (4) Date: Mar. 5, 2007

(87) PCT Pub. No.: WO2005/123422

PCT Pub. Date: Dec. 29, 2005

(65) Prior Publication Data

US 2007/0252685 A1 Nov. 1, 2007

(30) Foreign Application Priority Data

Jun. 16, 2004 (JP) ............................. 2004-178795
Jun. 16, 2004 (JP) ............................. 2004-178840

(51) Int. Cl.
*B60C 23/00* (2006.01)
*B60C 23/02* (2006.01)
(52) U.S. Cl. ...................... 340/442; 340/447; 340/443; 340/444; 340/445; 340/446; 73/146.2; 73/146.3; 73/146.4; 73/146.5

(58) Field of Classification Search ...................... None
See application file for complete search history.

(56) References Cited

U.S. PATENT DOCUMENTS 6,112,585 A 9/2000 Schrottle et al.

(Continued)

FOREIGN PATENT DOCUMENTS

JP 10-104103 A 4/1998

(Continued)

*Primary Examiner*—Daniel Wu
*Assistant Examiner*—Fekadeselassie Girma
(74) *Attorney, Agent, or Firm*—Sughrue Mion, PLLC

(57) ABSTRACT

A tire management system includes a sensor module secured to inside of a tire that is mounted on a vehicle, for measuring a tire state value and transmitting the measured data to the vehicle side, and a receiver module secured to the vehicle side for transmitting a signal demanding the measured data to the sensor module at a predetermined cycle and receiving the measured data transmitted from the sensor module. The sensor module measures a tire status value at a predetermined cycle, judges whether the measured data is out of a predetermined normal range, and immediately transmits the measured data and an abnormal state data through a predetermined channel exclusively used for transmitting the abnormal state data to the receiver module, if the data is judged to be out of the normal range. With this structure, if an abnormal state occurs, the receiver module can receive the abnormality without any delay, while preventing shortening of the cell life.

8 Claims, 9 Drawing Sheets

U.S. PATENT DOCUMENTS

| | | | |
|---|---|---|---|
| 6,604,416 B2 * | 8/2003 | Tsujita | 73/146.5 |
| 6,938,467 B2 * | 9/2005 | Tsujita | 73/146 |
| 6,958,686 B2 * | 10/2005 | Okubo | 340/447 |
| 7,049,948 B2 * | 5/2006 | Yagi et al. | 340/442 |
| 7,075,419 B2 * | 7/2006 | Watabe | 340/447 |
| 2002/0075145 A1 * | 6/2002 | Hardman et al. | 340/442 |
| 2003/0201882 A1 * | 10/2003 | Moore | 340/445 |
| 2004/0222882 A1 * | 11/2004 | Miyazaki | 340/445 |

FOREIGN PATENT DOCUMENTS

| | | |
|---|---|---|
| JP | 10-504783 A | 5/1998 |
| JP | 2000-142043 A | 5/2000 |
| JP | 2001-250186 A | 9/2001 |
| JP | 2003-16565 A | 1/2003 |
| JP | 2003-182328 A | 7/2003 |

* cited by examiner

TIRE MANAGEMENT SYSTEM WITH DATA DEMANDING SIGNAL AND TIRE STATUS VALUE TRANSMITTING AT DIFFERENT CYCLES

TECHNICAL FIELD

The present invention relates to improvement in a tire management system including a sensor module secured to inside of a tire mounted on a vehicle, for measuring a tire status value inclusive of a tire pressure, and a receiver module secured to the vehicle body side, for receiving the measured data transmitted form the sensor module.

BACKGROUND ART

In order to perform management of tires in use, there is known a proposal for mounting a tire management system onto a vehicle, wherein a sensor module is secured to inside of a tire, for measuring a tire status value inclusive of the pressure or temperature of the tire. In this instance, the measured data transmitted from the sensor module is received by a receiver module on the vehicle body side, and the received data is transmitted to a vehicle operation-managing center for managing operation of a plurality of vehicles. According to this proposal, based on the data of the tire management system of each vehicle, if it is judged that there is a possibility of failure of the vehicle, necessary instruction is given from the vehicle operation managing center to the driver so as to prevent occurrence of dangerous state. Reference may be had, for example, to Patent Document 1, Japanese Patent Application Laid-open Publication No. JP 10-104103 A.

In such a tire management system, a data demand signal is transmitted from each receiver module to a corresponding sensor module at a predetermined cycle, and the sensor module performs measurement of the tire status value in accordance with the reception timing of the data demand signal and transmits the measured results to the receiver module, thereby allowing the receiver module to acquire the measured data from the sensor module.

Patent Document 1: JP 10-104103 A

DISCLOSURE OF THE INVENTION

Task to be Solved by the Invention

Generally, a sensor module includes a built-in cell as an electric power source for electronic components such as a sensor, a CPU, a transmitter for transmission or reception of signals, etc. Furthermore, in order to prevent the dropping or damages to the sensor module due to vibration or deformation of the tire, the sensor module is secured in adhesion to the inner surface of the tire by baking or the like, so that the cell cannot be replaced in many instances. This means that the life of the cell determines the life of the sensor module, and it is thus highly important to prolong the cell life as far as possible. Among others, the processing performed by the sensor module, which consumes the maximum power, is the data transmission to the receiver module. The larger the number of measured data transmission per unit time, the more severely is the cell exhausted to shorten the cell life.

Therefore, by taking this into account, the transmission cycle T1 of the data demand signal to the sensor module is set to a large value. However, it has been confirmed that, due to a long transmission cycle, when an abnormal state occurs abruptly, such as the drop of the tire pressure, there may be instances that a long time elapses until the occurrence of abnormal state is received by the receiver module, with the result that the abnormal state cannot be properly overcome.

The present invention has been achieved in view of such a problem, and has for its object to provide a tire management system whereby, upon occurrence of an abnormal state, the receiver module can receive the abnormality without any delay, while preventing shortening of the cell life.

Means For Solving The Task

A first aspect of the present invention resides in a tire management system comprising a sensor module secured to inside of a tire mounted on a vehicle, for measuring a tire status value and transmitting the measured data to a vehicle body side, and a receiver module secured to the vehicle body side, for transmitting a signal demanding said measured data to the sensor module at a predetermined cycle, and receiving the measured data transmitted from the sensor module, wherein:

the receiver module transmits a data demand signal demanding transmission of the measured data, to the sensor module at a first cycle T1, and the sensor module measures at least one tire status value at a second cycle T2 that is shorted than said first cycle T1;

the sensor module is so designed as to judge, with respect to each measurement performed at the second cycle, whether the measured data is out of a predetermined normal range, and transmit, as soon as it has been judged that the measured data is out of a predetermined normal range, the measured data and a data indicating abnormal state to the receiver module through a predetermined abnormal state data transmission exclusive channel; and the receiver module having a frequency range for a demand signal channel for transmitting the measured data demand signal, and said sensor module having a frequency range of a response signal channel for said transmission based upon detection of reception for the data demand signal from said receiver module, said frequency ranges being so determined as to avoid overlapping with said abnormal state data transmission exclusive channel.

A second aspect of the present invention resides in a tire management system according to the first aspect, wherein the frequency range of the response signal channel is a channel selected from a plurality of predetermined channels having frequency ranges that do not overlap with each other, and the selection of the response signal channel is done by designating the channel by means of said data demand signal transmitted from the receiver module.

A third aspect of the present invention resides in a tire management system according to the first or second aspect, comprising a plurality of said abnormal state data transmission exclusive channels, said sensor module using a selected one of the abnormal state data transmission exclusive channels for transmitting the measured data that is out of said normal range.

A fourth aspect of the present invention resides in a tire management system according to any one of the first to third aspects, wherein each sensor module has an identification code for identifying the individual sensor module itself, and the data transmitted from the sensor module includes said identification code.

A fifth aspect of the present invention resides in a tire management system according to any one of the first to fourth aspects, wherein said transmission, which is performed by said sensor module to said receiver module when it has been judged that said data is out of the normal range, comprises setting an abnormal flag t to a value indicating the abnormal state, and transmitting, if a consecutive number of times of acquisition of the measured data deviating from the normal range is not larger than a predetermined integer N1, the nearest measured data and an abnormal flag data to the receiver module by a predetermined number of times N2, with a third cycle T3 that is smaller than said second cycle T2, said sensor module setting said abnormal flag to a value indicating a normal state, when said data is within said normal range, and said sensor module transmitting the nearest measured data and the data of the abnormal flag to the receiver module immediately upon detection of reception of the data demand signal from the receiver module.

A sixth aspect of the present invention resides in a tire management system according to the fifth aspect, wherein said integer N1 is smaller than a ratio T1/T2.

A seventh aspect of the present invention resides in a tire management system according to any one of the first to sixth aspects, wherein said sensor module comprises a read only memory ROM storing threshold vale for determining said normal range.

An eighth aspect of the present invention resides in a tire management system according to any one of the first to seventh aspects, wherein said receiver module performs a next transmission of the data demand signal to the sensor module with a cycle that is shorter than said first cycle T1, when the abnormal flag in a signal received form the sensor module indicates the abnormal state.

Effects of the Invention

With the first aspect of the present invention, the sensor module measures the tire status value with a cycle that is shorter than the transmission cycle of the data demand signal from the receiver module, and transmits, as soon as it has been judged that the measured data is out of a predetermined normal range, the measured data and a data indicating abnormal state to the receiver module. Additionally, the transmission of the abnormal state data based on the judgment is performed using an abnormal state data transmission exclusive channel. Thus, except for the timing of transmission and reception relating to the data demand, it is possible for the receiver module to positively receive the abnormal state data even if it has been abruptly transmitted, by monitoring the abnormal state data transmission exclusive channel, thereby allowing the sensor module to deliver the transmitted abnormal state data to the receiver module without any delay. Moreover, in a normal state of the tire status value, the sensor module transmits the measured data to the receiver module with a longer cycle in a conventional manner, without significant increase in consumption of the cell.

With the second aspect of the present invention, the frequency range of the response signal channel is a channel selected from a plurality of predetermined channels having frequency ranges that do not overlap with each other, and the selection of the response signal channel is done by designating the channel by means of the data demand signal transmitted from the receiver module. Thus, the data transmission from the sensor module is limited to a narrow band, besides that the receiver module designates in advance the channel to be used by the sensor module and ready for receiving the transmission from the sensor module through the designated channel. Therefore, in connection with transmission of the response signal based on the data demand signal also, the receiver module is capable of receiving the data from the sensor module with a high reception probability.

With the third aspect of the present invention, the tire management system includes a plurality of abnormal state data transmission exclusive channels, and the sensor module uses a selected one of the abnormal state data transmission exclusive channels for transmitting the measured data that is out of the normal range. Thus, by selecting a channel out of a plurality of abnormal state data transmission exclusive channels such that the selected channel does not overlap with the frequency band used by other communication systems, it is possible to eliminate cross-talk with the signals of other communication systems and thereby perform transmission and reception of the abnormal state data positively, and at higher speed.

With the fourth aspect of the present invention, each sensor module has an identification code for identifying the individual sensor module itself. Thus, even if cross-talk occurs with the signals of other communication systems, it is possible to judge whether the signal received is the desired signal, based on the identification code, so as to eliminate erroneous signal reception.

With the fifth aspect of the present invention, the transmission performed by the sensor module to the receiver module when it has been judged that said data is out of the normal range comprises setting an abnormal flag t to a value indicating the abnormal state, and transmitting, if a consecutive number of times of acquisition of the measured data deviating from the normal range is not larger than a predetermined integer N1, the nearest measured data and an abnormal flag data to the receiver module by a predetermined number of times N2, with a third cycle T3 that is smaller than said second cycle T2. Thus, it is possible to maximize the reception success probability of the transmission to the receiver module, while preserving a satisfactory cell life.

With the sixth aspect of the present invention, in connection with the transmission based on judgment of the occurrence of the abnormal state, the maximum number N1 of times of the consecutive transmission at the short cycle T2 is made smaller than a ratio T1/T2. Thus, the transmission is not performed over a long period larger than the long cycle T1 so as to eliminate premature exhaustion of the cell. Furthermore, when the tire is removed form the vehicle and stored in a deflated state, even though the sensor module performs the measurement at a second cycle T2, the transmission is not performed so as to suppress consumption of the cell.

With the seventh aspect of the present invention, the sensor module includes a read only memory ROM storing threshold vale for determining the normal range. Thus, the threshold value can be initially set in accordance with the size of the tire to which the sensor module is adhered, the threshold value is not rewritten to ensure a strict tire pressure management over a long period.

With the eighth aspect of the present invention, the receiver module performs a next transmission of the data demand signal to the sensor module with a cycle that is shorter than said first cycle T1, when the abnormal flag in a signal received form the sensor module indicates the abnormal state. Thus, eve when the data transmission from the sensor module at the second cycle T2 is completed, as long as the abnormal state lasts, it is possible to receive the tire status value at a cycle shorter than the first cycle T1, making it possible to immediately overcome the abnormal state.

BEST MODE FOR CARRYING OUT THE INVENTION

Figure 1:
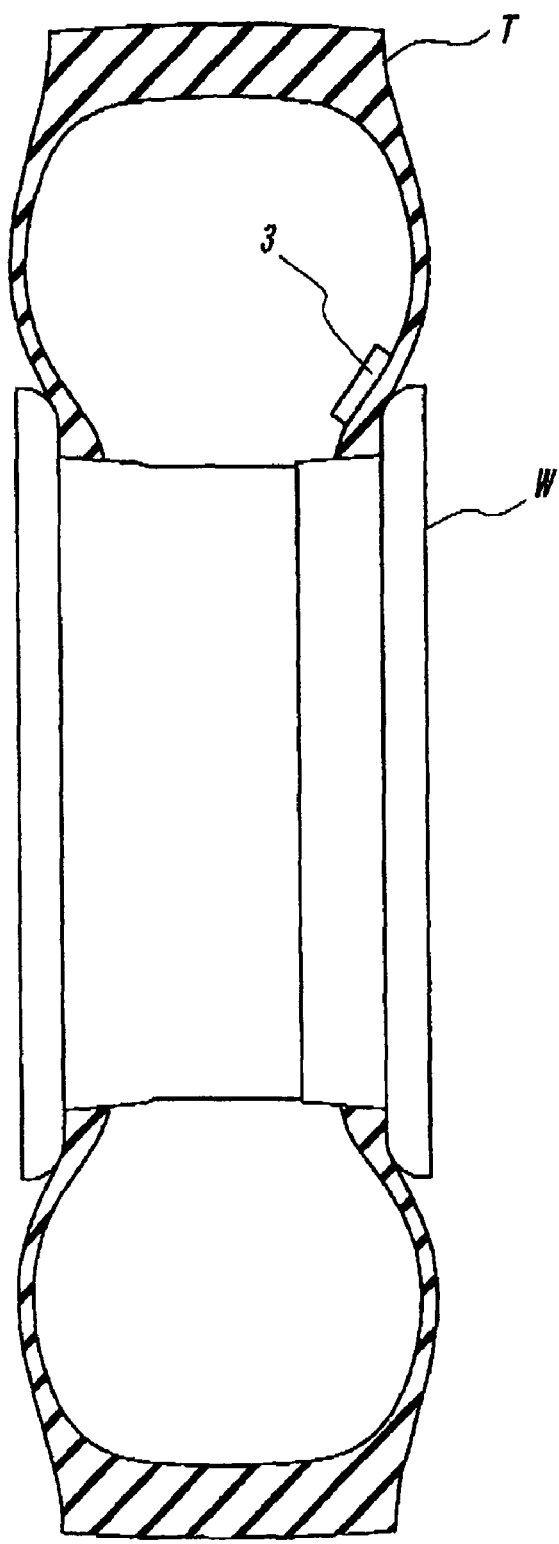
FIG. 1 is a sectional view of a sensor module secured to inside of a tire.
Figure 2:
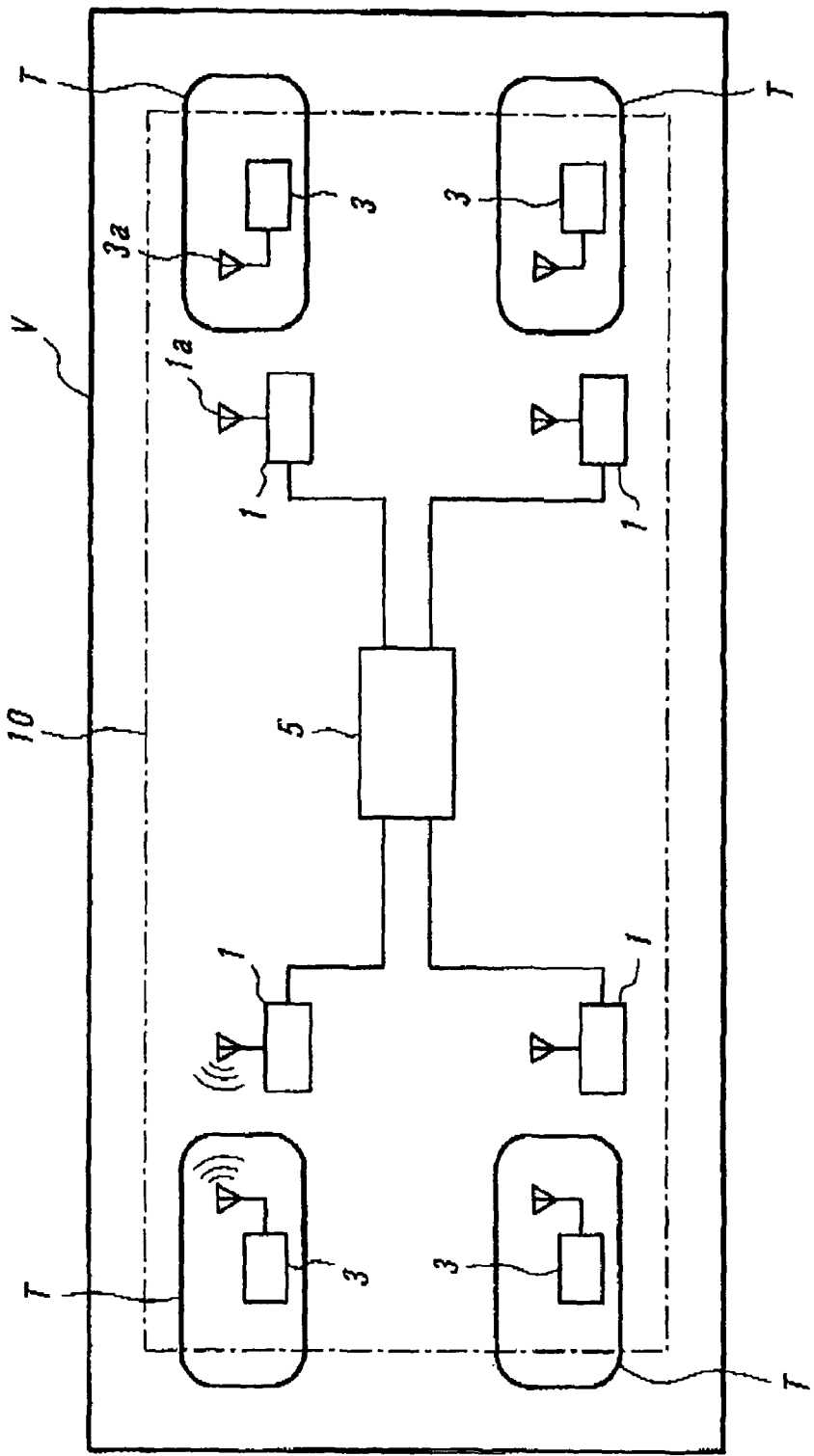
FIG. 2 is a schematic view showing the constitution of the tire management system.

The present invention will be further described below with reference to preferred embodiments illustrated in the accompanying drawings. FIG. 1 is a sectional view of a sensor module that is secured to the inside of a tire, and FIG. 2 is a schematic view showing the constitution of the tire management system. It can be seen that sensor modules 3 are secured inside of the respective tires, which are mounted on a vehicle V.

In the illustrated embodiment, the sensor module 3 is secured to the inner surface of a tire T by baking, so as to prevent it from separation or damages even when the tire during the running undergoes deformation under load. The sensor module 3 is comprised of a detector means for detecting tire pressure or the like, an antenna 3a and transmitter for data reception and transmission with a receiver module 1, and a controller means for controlling these elements. The detector means may comprise a detector for detecting the tire temperature, other than the tire pressure. The sensor module 3 secured to the inside of the tire T may be secured to the wheel W or supported by appropriate means, not shown, at a tire inner space defined between the tire T and the wheel W.

The tier management system 10 is provided for the vehicle V, and comprised of the sensor modules 3 secured to the inside of the respective tires T, receiver modules 1 for receiving the data from these sensor modules 3, and a central controller module 5 for commanding the reception of the data from the sensor modules 3 to the receiver modules 1. Each receiver module 1 is comprised of a transmitter and an antenna 1a for the reception and transmission of the data with the corresponding sensor module 3.

Figure 3:
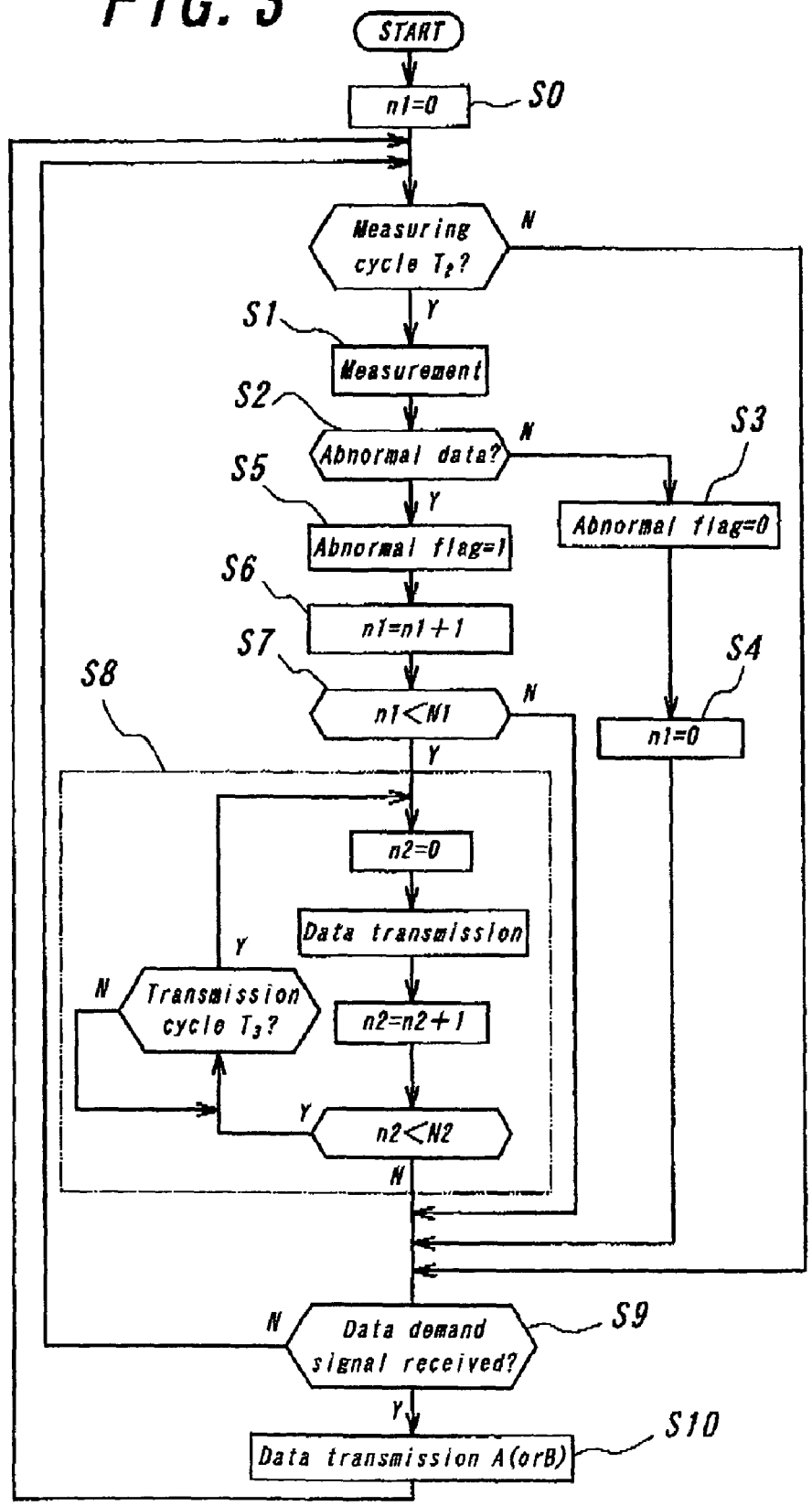
FIG. 3 is a flow chart showing the processing performed by the sensor module.

The present invention has been achieved to provide a tire management system 10 of the structure described above, wherein, upon occurrence of abnormality in the tire status value, the receiver module 1 is capable of receiving the abnormal state as promptly as possible, by satisfying the two conditions as follows. The first condition is to ensure that, upon occurrence of abnormality in the tire status value, the sensor module 3 detects such abnormality and transmits the detected results to the receiver module immediately. The second condition is to immediately receive the signal transmitted from the sensor module, inclusive of the abnormal state data. Among these, at the outset, the first condition will be further described below With reference to FIG. 3 showing the processing performed by the sensor module 3, in step S1, the sensor module 3 performs measurement for measuring the tire status value, such as tire pressure, an a time interval of a second cycle T2. Then, in step S2, a judgment is made as to whether the measured data is within a normal range (normal state) or out of the normal range (abnormal state). If the measured data is judged to be in the normal state, an abnormal flag is set to 0 (step S3), an n1 counter is cleared (step S4) and a monitoring operation is entered to monitor the presence or absence of a data transmission demand signal from the receiver module (step S9).

Here, the abnormal flag indicates whether the nearest measured data is in a normal state or abnormal state, and it is assumed in the illustrated embodiment that the value 1 indicates the abnormal state and the value indicates the normal state. The n1 counter is a counter indicating the number of consecutive measuring results of the abnormal state. When the measured data is in a normal state, the continuity is interrupted so that the n1 counter is initialized to 0 (step S0) upon starting of the system, in the processing at step S4. The n1 counter is then cleared once it assumes a value 1 due to the continuity of the measuring results of abnormal state.

As for the monitoring of the presence or absence of the data transmission demand signal from the receiver module, as explained with reference to step S9, the system may be operated so as to alternately repeat a sleeping mode and a wake-up mode under a predetermined cycle and monitor the data transmission demand only in the wake-up mode. In this instance, it is possible to suppress consumption of the cell in the sleeping mode.

In step S2, if the measured data indicates an abnormal state, the abnormal flag is set to the value 1 (step S5) and a judgment is made as to whether the number of consecutive measurement (n1+1) of the abnormal state is not larger than N1 or otherwise (steps S6, S7). If the number of consecutive measurement (n1+1) of the abnormal state is not larger than N1, the abnormal flag data and the measured data are transmitted to the receiver module (S8). This transmission is performed N2 times under a third cycle T3. In FIG. 3, the symbol "n2" indicates the counted value of the counter for counting the number of times of such transmission.

After completion of n2 times of transmission, the presence or absence of the data transmission demand signal from the receiver module 1 (step S9).

In step S9, if the data transmission demand signal from the receiver module 1 is detected, the sensor module 3 performs transmission of the nearest measured data and the abnormal flag data to the receiver module 1 only once (step S10). Incidentally, the measurement having the second cycle T2 (step S2) is performed at an independent timing, irrelevant to the data transmission based on the data demand from the receiver module 1.

Figure 4A:
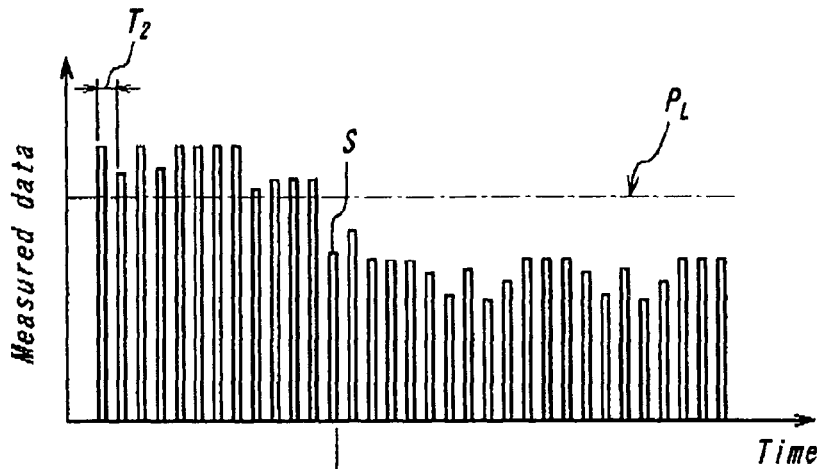
FIGS. 4(a) to 4(c) are timing charts showing examples of the output signals of the sensor module and the receiver module, when the tire status value changes from a normal state to abnormal state.
Figure 4B:
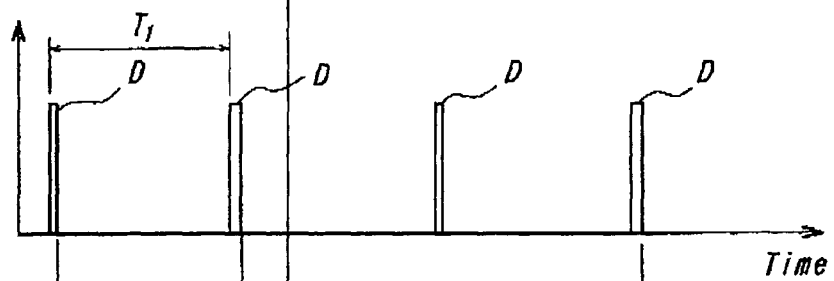
Figure 4C:
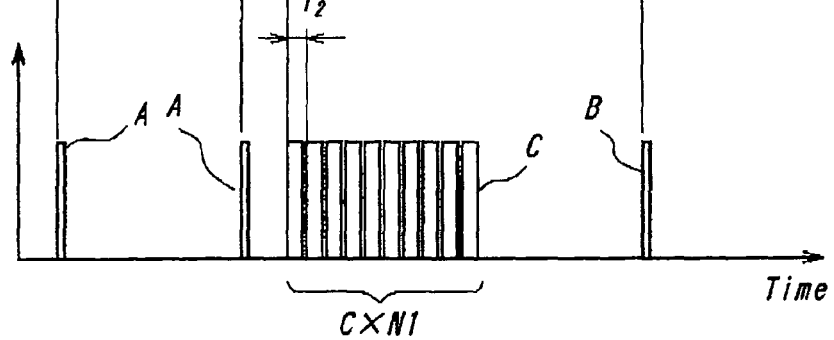
Figure 5:
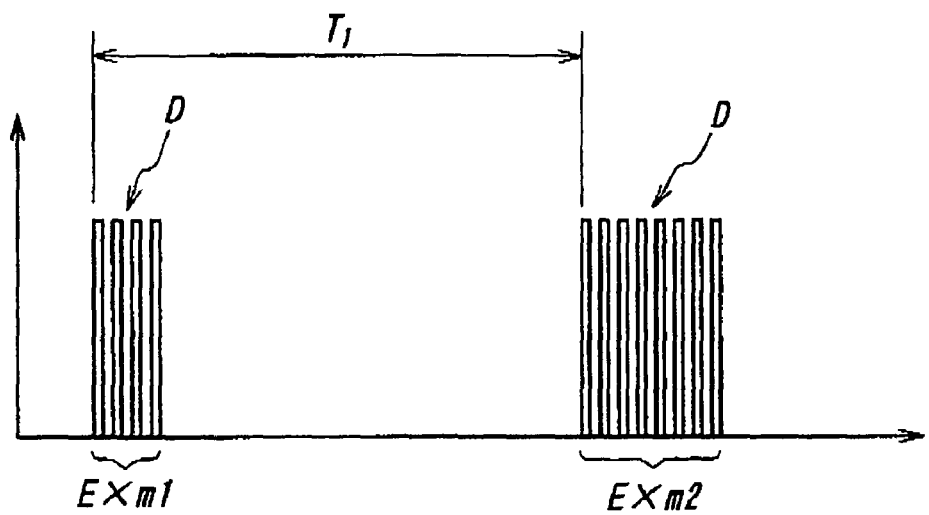
FIG. 5 is a chart showing the signal D of FIG. 4(b) in enlarged scale.
Figure 6:
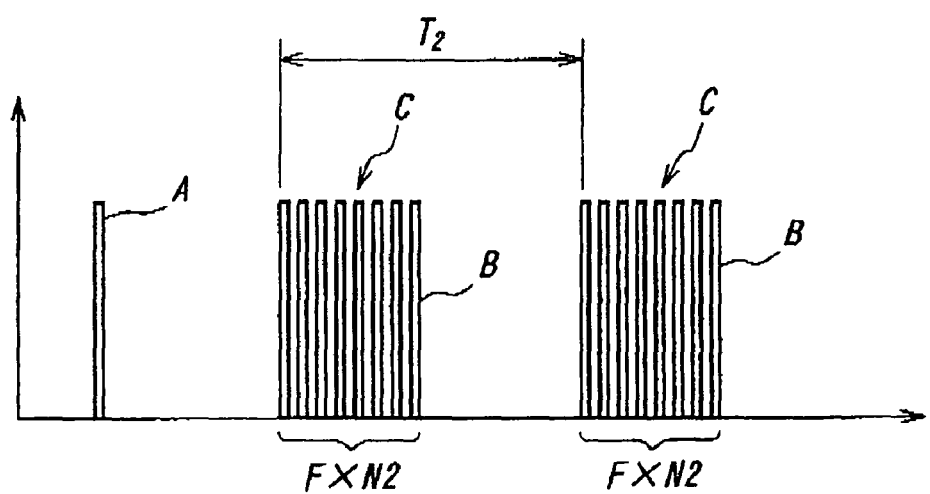
FIG. 6 is a chart showing the signal C of FIG. 4(c) in enlarged scale.
Figure 7A:
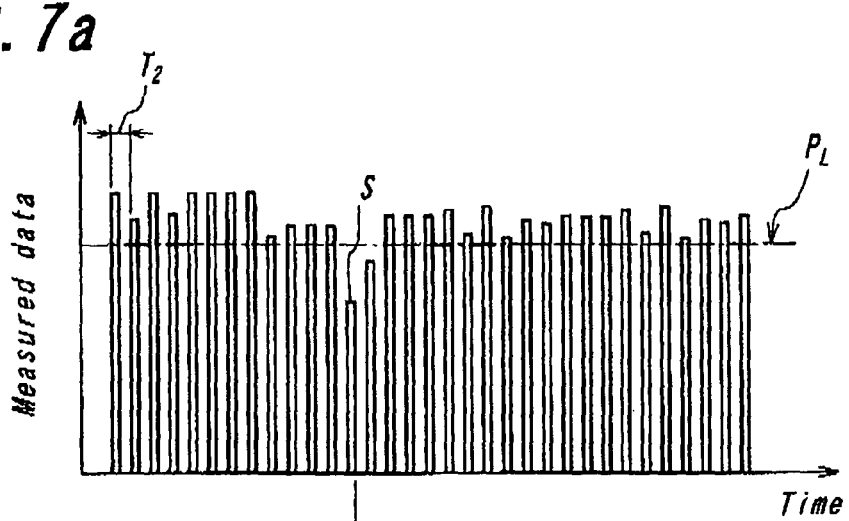
FIGS. 7(a) to 7(c) are timing charts showing examples of the output signals of the sensor module and the receiver module, when the tire status value resumes to a normal state slightly after the change from a normal state to abnormal state.
Figure 7B:
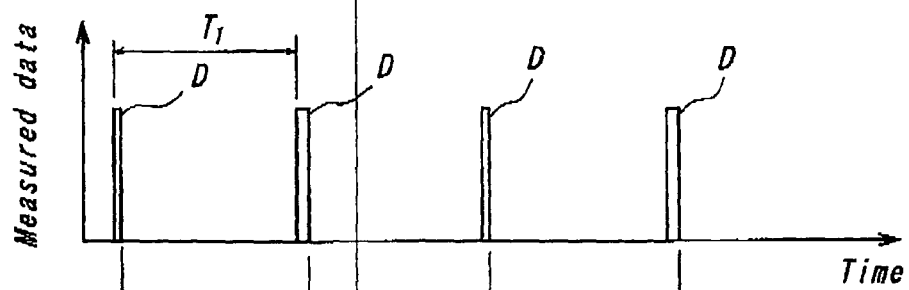
Figure 7C:
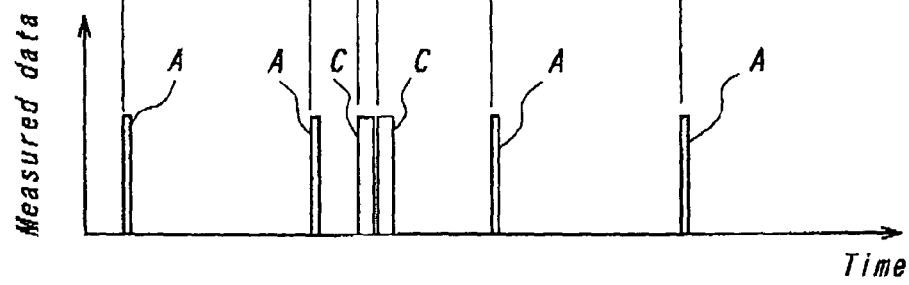

In the next place, examples of the timing for the measurement and transmission by the sensor module 3 and the transmission of the data demand signal by the receiver module 1 will be described below. FIGS. 4(a) to 4(c) are timing charts showing examples of the output signals from the sensor module 3 and the receiver module 1, when the tire status value changes from a normal state to abnormal state. FIG. 5 is a chart showing the signal D of FIG. 4(b) in enlarged scale and FIG. 6 is a chart showing the signal C of FIG. 4(c) in enlarged scale. FIGS. 7(a) to 7(c) are timing charts showing examples of the output signals of the sensor module and the receiver module, when the tire status value resumes to a normal state slightly after the change from a normal state to abnormal state.

The timing chart of FIG. 4(a) shows the measuring timing of the sensor module 3 as pulses, with the abscissa representing time, wherein the value of the measured data of each measurement is indicated as the pulse height. In FIG. 4(a), the symbol $P_L$ denotes the limit value of the tire status value to be measured. Thus, for example, when the tire status value to be measured is the tire pressure, the value $P_L$ represents the lower limit value permitted to the tire pressure, and the tire pressure value below $P_L$ is an indication of an abnormal state. In the example shown in FIG. 4(a), the measured data obtained after the measurement identified by the symbol "S" indicates a continued abnormal state. Incidentally, the limit value of the normal range is stored in a read only memory ROM, so that it cannot be readily rewritten. In this instance, the measurement is performed under a predetermined second cycle T2.

The time chart of FIG. 4(b) shows the transmission timing of the data demand signal from the receiver module 1 to the sensor module 3, demanding transmission of the measured data. The transmission cycle is defined as the first cycle T1, which may be determined independently of the measuring timing of the sensor module 3. The transmission of the data demand signal is repeatedly performed at a time interval of the cycle T1.

Here, the second cycle T2 is set to be shorter than the first cycle T1, so as to ensure that the measurement is performed with the cycle that is shorter than the data transmission cycle as long as the tire status value is in a normal state, and an abrupt occurrence of the abnormal state cannot be properly overcome without sacrificing the cell life.

The timing chart of FIG. 4(c) shows the transmission timing of the sensor module 3. It can be seen that when the data demand signal is received from the receiver module 1, the sensor module 3 performs a transmission A for transmitting the abnormal flag data and the measured data only once. If it is judged, as a result of the measurement performed at the cycle T2, that the measured data is out of the normal range, then another transmission C is performed in addition to the transmission A. This transmission C is performed a predetermined number N1 of times, and is not performed thereafter even if the measured data obtained by the previous measurement is abnormal, as long as the abnormal state continues.

On the other hand, even after completion of the N1 times of transmission, the data demand signal is transmitted from the receiver module 1 to the sensor module 3 under the cycle T1, so that the sensor module 3 correspondingly performs transmission of the measured data and the abnormal flag data. Here, the transmission B is distinguished from the transmission A because the value of the abnormal flag as transmitted by the transmission A is 0, whereas the value of the abnormal flag as transmitted by the transmission B is 1. The transmissions A and B are different from each other in this respect only.

As shown in FIG. 5, the data demand signal D transmitted by the receiver module 1 is comprised of a session of single data demand signals E of the number m1 (or m2), which are transmitted under the predetermined cycle. When there is no data transmission from the sensor module 3 within a predetermined time, in response to the transmitted data demand signal E, the data demand signal is transmitted again to wait for the data transmission from the sensor module 3. In this way, the transmission of the data demand signal E is continued until the data transmission from the sensor module 3 is confirmed. Thus, the number of the data demand signals E is variable according to the presence or absence of the data transmission from the sensor module.

On the other hand, as shown in FIG. 6, the transmission C performed by the sensor module 3 when the measured data obtained by the measurement is out of the normal range is comprised of a session of single data demand signals F of the number N2, which are transmitted under a predetermined third cycle T3. When the number N2 is increased, the data reception probability of the receiver module increases, though the cell consumption increases also. This fact is taken into account when determining the optimum number N2.

Although FIGS. 4(a) to 4(c) show the signal timing when abnormal state continues for a long time after a normal state, a different measure is taken when a normal state is resumed immediately after a short duration of the abnormal state. In the latter case, as shown in FIGS. 7(a) to 7(c), even if the number of consecutive abnormal measured data is less than N1, the transmission C under the second cycle T2 is stopped. The transmission C under the second cycle T2 is not performed until the tire status value becomes abnormal again, in order to suppress the cell consumption. It is preferred that the number N1 is not larger than T1/T2. This is because even if the number N1 is made larger than T1/T2, advantages commensurate with the cell consumption may not be expected.

FIGS. 7(a) to 7(c) show examples of the transmission timings which are different from those of FIGS. 4(a) to 4(c). Thus, FIG. 7(a) shows the measuring timing of the sensor module 3 as pulses, with the abscissa representing time, wherein the value of the measured data of each measurement is indicated as the pulse height, FIG. 7(b) shows the transmission timing of the data demand signal from the receiver module 1 to the sensor module 3, demanding transmission of the measured data, and FIG. 7(c) shows the transmission timing of the sensor module 3.

Here, as the preferred examples of the cycles T1, T2 and T3, the cycle T1 may be within a range from 10 minutes to 1 hour, the cycle T2 may be within a range from T1/2 to T1/20, and the cycle T3 may be within a range from 10 ms to 100 ms.

Figure 8:
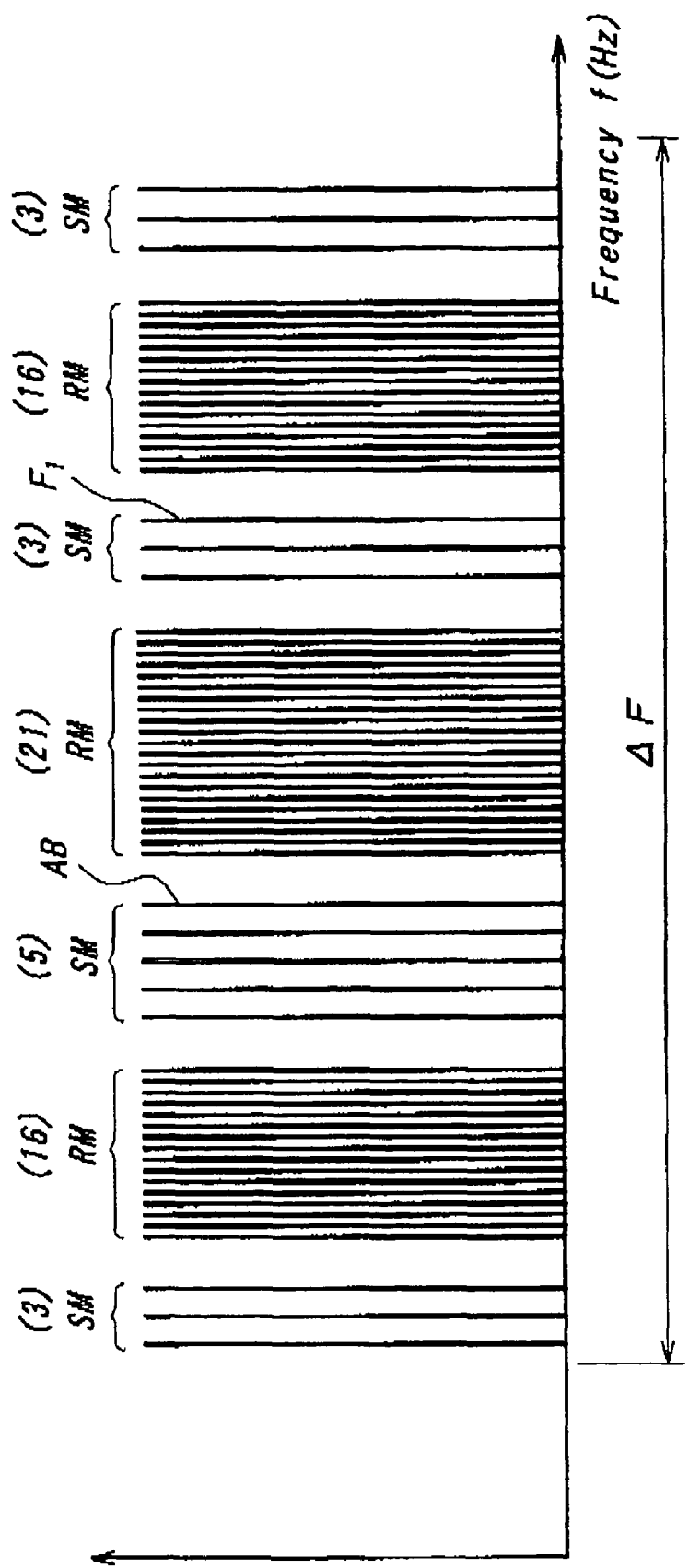
FIG. 8 is a conceptual view showing the frequency ranges for data transmission by the sensor module and the receiver module, respectively.

The foregoing description of the concrete examples relates primarily to the first condition to be satisfied by the present invention. In the next place, the measures for satisfying the second condition imposed on the present invention will be explained, i.e., the condition for the receiver module 1 to immediately receive the data transmitted from the sensor module 3. FIG. 8 is a conceptual view showing the frequency ranges for the data transmission by the sensor module 3 and the receiver module 1, respectively, wherein the abscissa indicates the frequency.

The frequency ranges for the data transmission by the sensor module 3 and the receiver module 1, respectively, are determined by previously dividing a predetermined frequency range $\Delta F$ into a plurality of channels which do not overlap with each other, as shown, and assigning these channels depending upon the purpose of use, conditions, etc.

In the illustrated example, 53 channels RM in total are assigned for the transmission of the data demand signal from the receiver module 1 to the sensor module 1, and 14 channels SM in total are assigned for the transmission of the measured data from the sensor module 3 to the receiver module 1.

Among the 14 channels for the transmission of the measured data, one channel AB is designated as an abnormal state data transmission exclusive channel for the transmission C (FIG. 3) based on the judgment of the sensor module 3. Thus, the transmission C is always performed through the abnormal state data transmission exclusive channel AB.

When the transmission from the sensor module 3 is the transmission A or B (FIG. 3) based on the data demand signal from the receiver module 1, one channel selected from the remaining 13 channels is designated as a channel F1 for the response signal, and the measured data is transmitted to the receiver module using the designated response signal channel F1. The selection of the response signal channel F1 is randomly made using a random number table, for example, and a channel number or an identification code of the selected channel is transmitted as part of the data demand signal transmitted from the receiver module 1 to the sensor module 3. When the data demand signal is received, both the transmissions A and B corresponding to the normal state and the abnormal state, respectively, are performed by the sensor module 3 to transmit the data using the channel F1 of the designated channel number.

Figure 9A:
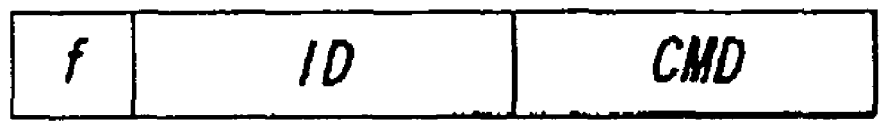
FIGS. 9(a) and 9(b) are conceptual views showing the structure of the data transmitted by the sensor module and the receiver module, respectively.
Figure 9B:

FIGS. 9(a) and 9(b) are conceptual views showing the data structure, and it can be seen that the data command signal to be received by the receiver module includes, as shown in FIG. 9(a), a command CMD indicating the data transmission command, an identification code ID of the sensor module 3 to which the data transmission command is to be transmitted, besides the code f indicating the channel to be used by the sensor module 3 for transmitting the data, as explained above. On the other hand, the signal to be transmitted by the sensor module 3 includes, as shown in FIG. 9(b), the measured data DATA, abnormal flag FLAG, and an ID of the sensor module 3 that performs the transmission.

Here, the receiver module 1 monitors the designated channel F1, immediately after the reception of the data demand signal. During the other period, however, the receiver module 1 may be placed in a waiting mode for monitoring the abnormal state data transmission exclusive channel AB for receiving the abnormal state data, making it possible to receive the abnormal state data as soon as it has been transmitted from the sensor module.

Incidentally, the abnormal state data transmission exclusive channel AB is selected from the 14 channels SM as a channel that is free from cross-talk with the other communication systems. The channel to be selected may be changed depending upon the conditions of the surrounding communication systems, so as to more efficiently prevent cross-talk.

The distance between the neighboring channels must be determined so as to avoid interference, and this distance is preferably not less than 200 Hz, and more preferably not less than 500 Hz.

Figure 10:
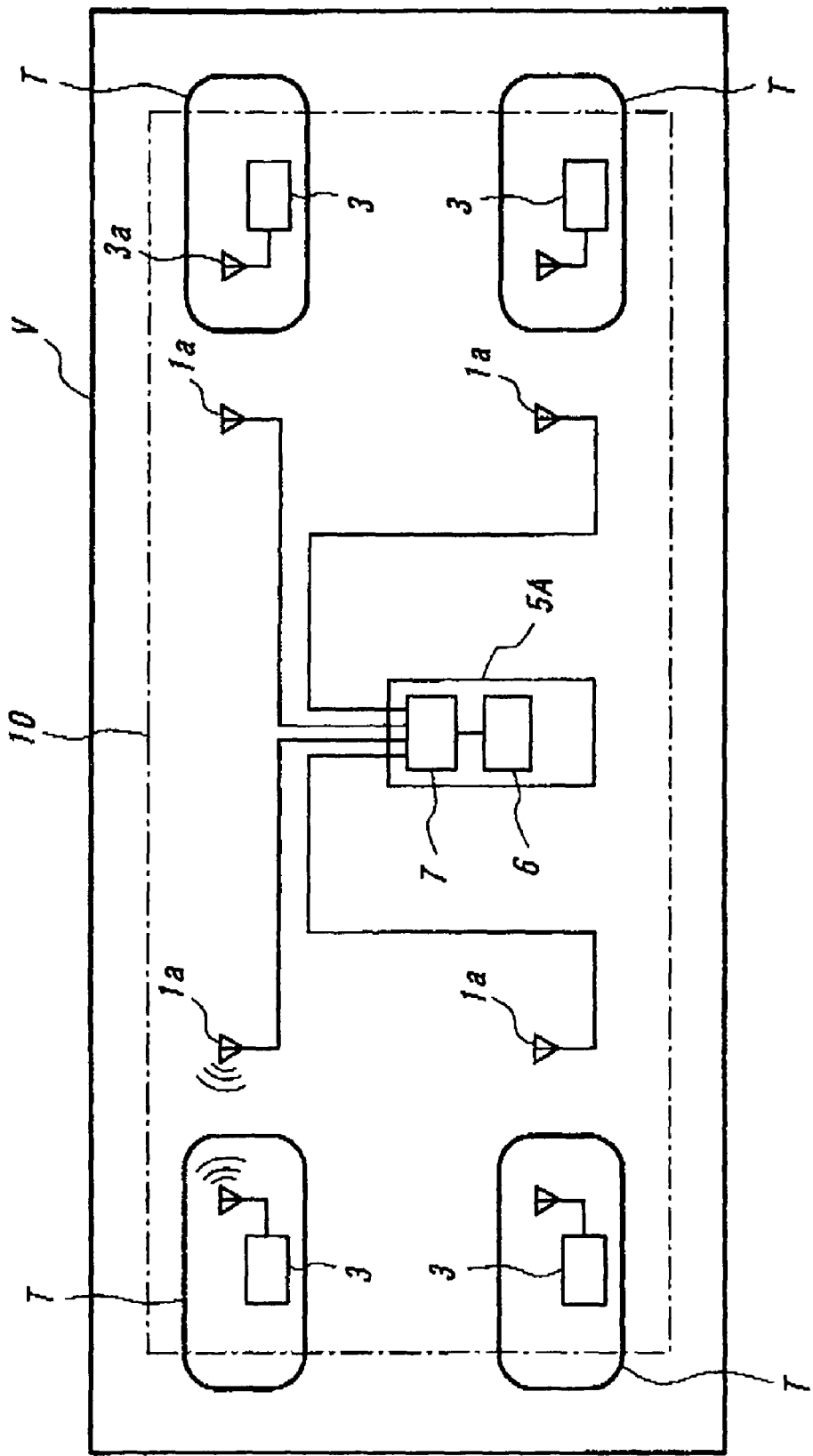
FIG. 10 a schematic view showing the constitution of the tire management system according to a modified embodiment.

A modified embodiment of the tire management system according to the present invention will be described below. In the previous embodiment, as shown in FIG. 2, the receiver module 1 and its antenna 1a are arranged adjacent to the tire in which the sensor module 3 is provided. However, as schematically shown in FIG. 10, illustrating the tire management system 10A of the modified embodiment, the receiver module 6 may be arranged inside of the central controller module 5A. Thus, the tire management system 10A is comprised of at least one receiver module 6 arranged inside of the central controller module 5A, and an antenna switching means 7 arranged between the receiver module 6 and a plurality of antennas 1a. The antenna switching means 7 may be operated to select an antenna 1a to be connected to the receiver module 6, so that at least one receiver module 6 (a single receiver module in the illustrated embodiment) common to these antennas 1a serves to handle signal processing with respect to all the antennas 1a. The antenna switching means 7 may be comprised of a wiring relay, a semiconductor switch, etc., though it is also possible to provide the receiver module 6 with ports as hardware, which are always-on connected to the respective antennas 1a, and open or close these ports by a software. When the receiver module is arranged adjacent to the tire, the receiver module may be subjected to damages because the surroundings of the tire are frequently attacked by pebbles or the like during the running of the vehicle. However, by arranging only the antennas 1a adjacent to the tires and integrating the receiver module with the central controller module, which is not attacked by pebbles, the components liable to get damages by pebbles are limited to the antennas, so as to minimize the damages. Moreover, the entire structure can be simplified by integrating the receiver module and the central controller module.

INDUSTRIAL APPLICABILITY

The present invention is applicable, not only to tire management systems for construction vehicles, but also to tire management systems for achieving a real time measurement of the tire status information of all the types of tires, including passenger car tires.

The invention claimed is:

1. A tire management system comprising a sensor module secured to inside of a tire mounted on a vehicle, for measuring a tire status value and transmitting the measured data to a vehicle body side, and a receiver module secured to the vehicle body side, for transmitting a signal demanding said measured data to the sensor module at a predetermined cycle, and receiving the measured data transmitted from the sensor module, wherein:

the receiver module transmits a data demand signal demanding transmission of the measured data, to the sensor module at a first cycle T1, and the sensor module measures at least one tire status value at a second cycle T2 that is shorter than said first cycle T1;

said sensor module is so designed as to judge, with respect to each measurement performed at the second cycle, whether the measured data is out of a predetermined normal range, and transmit as soon as it has been judged that the measured data is out of a predetermined normal range, the measured data and a data indicating abnormal state to the receiver module through a predetermined abnormal state data transmission exclusive channel; and said receiver module having a frequency range for a demand signal channel for transmitting the measured data demand signal, and said sensor module having a frequency range for a response signal channel for said transmission based upon detection of reception of the data demand signal from said receiver module, said frequency ranges being so determined as to avoid overlapping with said abnormal state data transmission exclusive channel.

2. The tire management system according to claim 1, wherein the frequency range of the response signal channel is a channel selected from a plurality of predetermined channels having frequency ranges that do not overlap with each other, and the selection of the response signal channel is done by designating the channel by means of said data demand signal transmitted from the receiver module.

3. The tire management system according to claim 1 or 2, comprising a plurality of said abnormal state data transmission exclusive channels, said sensor module using a selected one of the abnormal state data transmission exclusive channels for transmitting the measured data deviating from said normal range.

4. The tire management system according to claim 1, wherein each sensor module has an identification code for identifying the individual sensor module itself, and the data transmitted from the sensor module includes said identification code.

5. The tire management system according to claim 1, wherein said transmission, which is performed by said sensor module to said receiver module when it has been judged that said data is out of the normal range, comprises setting an abnormal flag t to a value indicating the abnormal state, and transmitting, if a consecutive number of times of acquisition of the measured data deviating from the normal range is not larger than a predetermined integer N1, the nearest measured data and an abnormal flag data to the receiver module by a predetermined number of times N2, with a third cycle T3 that is smaller than said second cycle T2, said sensor module setting said abnormal flag to a value indicating a normal state, when said data is within said normal range, and said sensor module transmitting the nearest measured data and the data of the abnormal flag to the receiver module immediately upon detection of reception of the data demand signal from the receiver module.

6. The tire management system according to claim 5, wherein said integer N1 is smaller than a ratio T1/T2.

7. The tire management system according to claim 1, wherein said sensor module comprises a read only memory ROM storing a threshold value for determining said normal range.

8. The tire management system according to claim 1, wherein said receiver module performs a next transmission of the data demand signal to the sensor module with a cycle that is shorter than said first cycle T1, when the abnormal flag in a signal received form the sensor module indicates the abnormal state.

* * * * *